United States Patent [19]

Kolodny et al.

[11] Patent Number: 4,856,069

[45] Date of Patent: Aug. 8, 1989

[54] REMOTE TYPING SYSTEM

[75] Inventors: Gerald M. Kolodny, West Newton; Howard I. Cohen, Waltham, both of Mass.

[73] Assignee: Sudbury Systems, Inc., Sudbury, Mass.

[21] Appl. No.: 135,467

[22] Filed: Dec. 21, 1987

Related U.S. Application Data

[63] Continuation of Ser. No. 39,786, Apr. 16, 1987, abandoned, which is a continuation of Ser. No. 473,668, Mar. 9, 1983, abandoned.

[51] Int. Cl.⁴ .............................................. G10L 5/00
[52] U.S. Cl. ..................................................... 381/52
[58] Field of Search ............... 369/29, 200 MS File, 369/900 MS File

[56] References Cited

U.S. PATENT DOCUMENTS

| | | | |
|---|---|---|---|
| 3,648,249 | 3/1972 | Goldsberry | 340/172.5 |
| 4,272,813 | 6/1981 | Howell et al. | 364/900 |
| 4,338,494 | 7/1982 | Theis | 379/72 |
| 4,399,527 | 8/1983 | Titus, IV et al. | 369/28 |
| 4,418,416 | 11/1983 | Lese et al. | 375/5 |
| 4,430,726 | 2/1984 | Kasday | 364/900 |
| 4,462,085 | 6/1984 | Yamamoto et al. | 364/900 |
| 4,468,751 | 8/1984 | Plunkett, Jr. | 364/900 |
| 4,488,274 | 12/1984 | Plunkett, Jr. | 369/24 |

Primary Examiner—Gareth D. Shaw
Assistant Examiner—John G. Mills
Attorney, Agent, or Firm—John C. Smith, Jr.

[57] ABSTRACT

A typing station at a remote location having a central processing unit and a terminal is interconnected with an information storage and retrieval system via a single telephone line. A typist at the remote location depresses a foot pedal associated with the central processing unit and controls shared transmission of audio messages and digital data between the typing station and the information storage and retrieval system. When the foot pedal is depressed, audio information is transmitted from the information storage and retrieval system at a central location to the typing station at the remote location. When the foot pedal is released, digital data defining previously transcribed audio information which is stored in the central processing unit is transmitted to the information storage and retrieval system via the single telephone line.

10 Claims, 1 Drawing Sheet

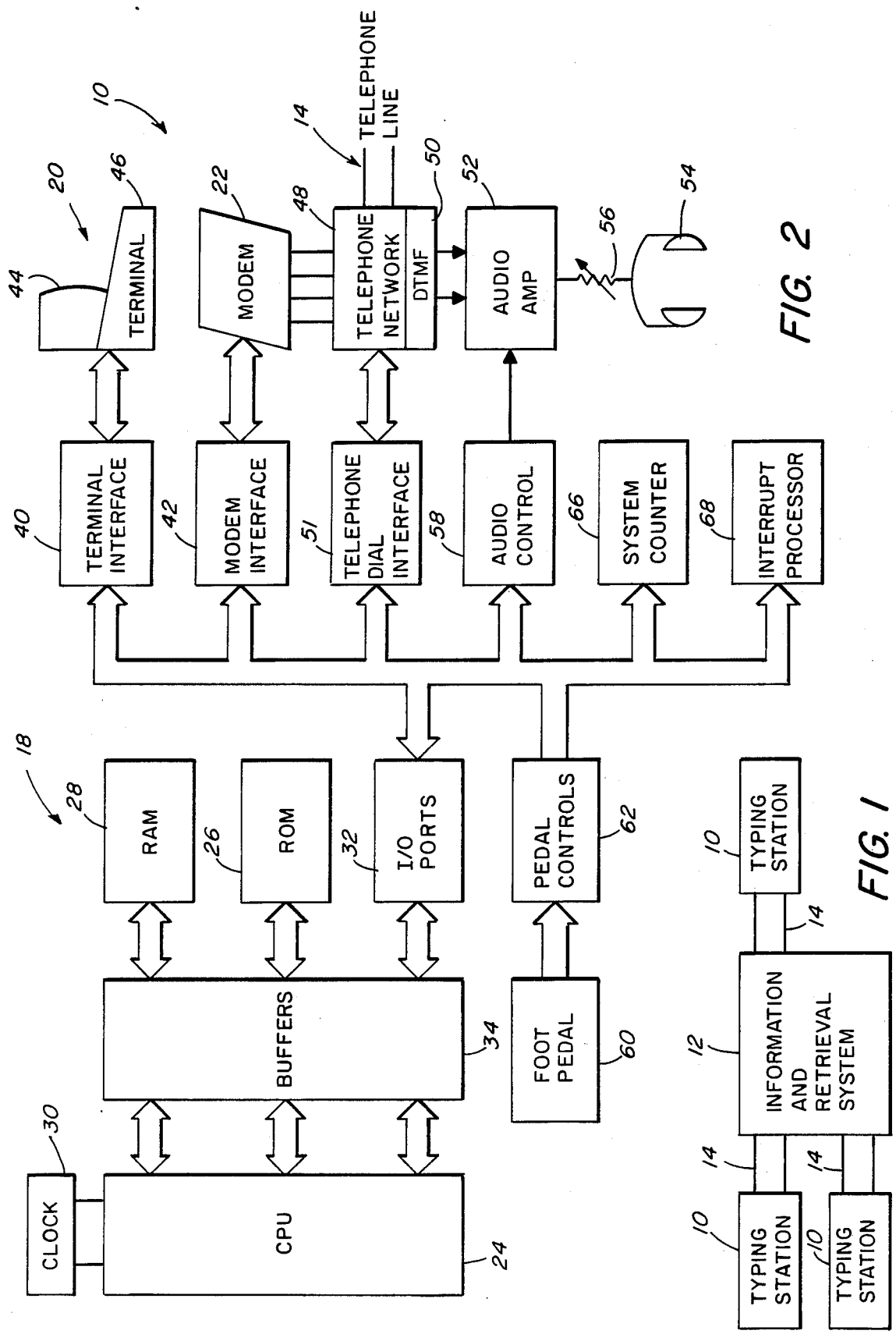

REMOTE TYPING SYSTEM

This is a continuation of application Ser. No. 039,786 filed on Apr. 16, 1987, which is a continuation of application Ser. No. 473,668 filed on Mar. 9, 1983, both now abandoned.

BACKGROUND OF THE INVENTION

1. Field of the Invention

The present invention relates to typing stations and, more particularly, is directed toward remote typing stations for information storage and retrieval systems.

2. Description of the Prior Art

U.S. Pat. No. 4,260,854 describes an information storage and retrieval system which provides multiple dictation inputs and retrieval outputs to users. Typically, hard-copy transcription of audio reports is carried out by a pool of centrally located typists who have access to and control over the audio reports which have been previously stored in the system. The audio is controlled by sending dual tone multiple frequency (DTMF) tone bursts over one line and the audio is heard coming in on another line. Since this is analog transmission in both directions (normal telephone usage), there is no problem so long as transmission is over two telephone lines. This method is adequate when copies are distributed directly from the local typewriter to the user community. However, for various reasons, it is often advantageous to have the typist sit at a remote terminal and input the transcribed copy directly to a computer through the use of a modem and a terminal. The hard copy of the transcribed data is presented at a central distribution point where it can be edited, printed, and distributed. The problem with this scheme is that while the telephone line is being used for data communications with the computer, it is not normally available for transmission of audio messages. In the data transmission mode, there is a carrier on the telephone line which is frequency shifted for the transfer of data. This operation would not tolerate any analog information on the same line at the same time. U.S. Pat. Nos. 3,648,249; 4,221,938; 4,301,525; 4,303,998 and 4,319,337 disclose dictating systems having central recording units that communicate with remote dictating and transcribing stations.

SUMMARY OF THE INVENTION

It is an object of the present invention to provide a remote typing station for an information storage and retrieval system.

It is another object of the present invention to provide a remote typing station with time sharing of analog audio information and digital data transmission on a single telephone line between the typing station and an information storage and retrieval system.

It is a further object of the present invention to provide a remote typing station for shared transmission of both digital data and analog voice signals on a single telephone line, digital data being transmitted during lulls in analog signal transmission. The remote typing station is characterized by a computer controlled terminal for a typist to transcribe the audio information. When the typist depresses a foot pedal, an audio mode is established. In the audio mode, analog audio message signals stored in the information storage and retrieval system are sent to the typist via the telephone line. When the foot pedal is released, the audio mode is terminated and a data mode is initiated. In the data mode, digital data defining transcribed audio information is transmitted on the telephone line from the terminal to the information storage and retrieval system. That is, digital data is transmitted during lulls in the transmission of audio messages. Accordingly, the remote typing station is characterized by an automatic shared mode of single telephone line utilization.

Other objects of the present invention will in part be obvious and will in part appear hereinafter.

The invention accordingly comprises the apparatuses and systems, together with their parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a block and schematic diagram showing a plurality of remote typing stations embodying the invention which are interconnected with an information storage and retrieval system; and FIG. 2 is a block and schematic diagram of one of the remote typing stations of FIG. 1.

DETAILED DESCRIPTION OF THE PREFERRED EMBODIMENTS

Referring now to the drawings, particularly FIG. 1, there is shown a plurality of remote typing stations 10 embodying the present invention, each station being interconnected with a central information storage and retrieval system 12 via a single telephone line 14. In the preferred embodiment, information storage and retrieval system 12 is a multiple access information storage and retrieval system of the type disclosed in U.S. Pat. No. 4,260,854. Information storage and retrieval system 12 includes a plurality of storage devices which contain recorded audio information, for example a medical report. A typist at each remote station 10 has access to information storage and retrieval system 12 via telephone line 14 for retrieving the stored audio information. The typist transcribes the retrieved audio information and transmits digital data defining the transcribed information to information storage and retrieval system 12 via telephone line 14. As hereinafter described, the audio information and digital data are transmitted between remote typing station 10 and information storage and retrieval system 12 via telephone line 14 on a shared basis, digital data being sent during lulls in audio information transmission.

Referring now to FIG. 2, it will be seen that remote typing station 10 includes a computer 18, a terminal 20 and a modem 22. Computer 18 includes a central processing unit (CPU) 24, a read-only memory (ROM) 26 and a random access memory (RAM) 28. In the illustrated embodiment, CPU 24 is a Z-80 microprocessor integrated circuit which receives clock pulses from a clock 30, for example a 2.048 megahertz clock. ROM 26 has four 2K ROM chips and provides a total of 8K bytes for program storage. RAM 28 has three banks of 16K RAM chips which provide 48K bytes of storage, most of which are used for a text buffer to allow room for a typist to type the report, edit the typed report and for modem 22 to work on sending the report to information storage and retrieval system 12. Input/Output (I/O)

ports 32, ROM 26 and RAM 28 communicate with CPU 24 via buffers 34. I/O ports 32 serve as an interface between CPU 24 and other assemblies in remote terminal station 10.

In the illustrated embodiment, computer 18 uses parallel data and terminal 20 and modem 22 use serial data. A terminal interface 40 converts parallel data generated by computer 18 into serial data for terminal 20 and converts serial data generated by terminal 20 and converts it to parallel data for computer 18. A modem interface 42 converts parallel data generated by computer 18 into serial data for modem 22 and converts serial data in modem 22 into parallel data for computer 18.

Terminal 20 is a standard RS-232 interface video display unit having a display 44 and a keyboard 46. Special keys are provided in keyboard 46 which allow the typist to control typing and editing of reports. Modem 22 receives input signals from a telephone network 48 and modem interface 42. The signals from telephone network 48 are filtered in modem 22 and fed through modem interface 42 to computer 18 for processing. Transcribed data signals from computer 18 are fed through modem interface 42 to modem 22 where they are filtered and transmitted to telephone line 14 via telephone network 48. Although not shown, modem 22 preferably includes a hard limiter for waveform shaping and a carrier detector for computer 18 monitoring of anomalies that might cause loss of data.

Telephone network 48 includes a dual tone multiple frequency (DTMF) generator 50 which generates tones for controlling information storage and retrieval system 12. Preferably, a plurality of photo-transistors are provided for minimum loading and maximum isolation from telephone line 14. A telephone interface 51 which is connected between computer 18 and telephone network 48 allows signals from the computer to energize the DTMF generator 50 and transmit tone signals on telephone line 14. In this way, the typist who is to transcribe the recorded messages controls the transmission of the audio information from information storage and retrieval system 12 to typing station 10. The audio information from telephone network 48 is fed through an audio amplifier 52 to a headset 54. A volume control 56 is provided for regulating the volume of incoming audio information. An audio control 58, which is connected to audio amplifier 52, receives command signals from computer 18 and mutes the audio amplifier during the time period when data signals are being transmitted from remote typing station 10 to information storage and retrieval system 12.

A foot pedal 60 and a pedal control 62 govern the transmission of data between remote typing station 10 and information storage and retrieval system 12. Foot pedal 60 is a dual switch pedal with a debounce/delay circuit. When one side of foot pedal 60 is depressed, a forward command signal is sent to information storage and retrieval system 12 and an audio message is transmitted therefrom in the forward direction. When the other side of foot pedal 60 is depressed, a reverse command signal is sent to information storage and retrieval system 12 and an audio message is transmitted in the reverse direction. The transmission of the audio message in the reverse direction allows the typist to listen to a particular section of the audio message several times. Whenever the typist's foot is removed from foot pedal 60, a stop signal is generated and transmission of audio information stops.

A system counter 66, for example a counter/timer controller (CTC) integrated circuit, generates a baud rate clock for timing data transfer to modem 22 and data transfer to terminal 20. An interrupt processor 68, in response to request signals generated by terminal 20, modem 22, foot pedal 60 and system counter 66, generates an interrupt request signal which is applied to computer 18. At the same time, the request signal is latched so that computer 18 can determine which device initiated the request signal.

As previously indicated, the typist controls transmission of audio information from information storage and retrieval system 12 by depressing foot pedal 60. When foot pedal 60 is depressed, a dual tone multiple frequency tone burst from the DTMF generator 50 is sent to information storage and retrieval system 12 via single telephone line 14. Computer 18 initiates an audio mode and audio information is transmitted from information storage and retrieval system 12 to remote typing station 10. The typist transcribes the audio message using keyboard 46, the transcribed data being presented on display 44. By energzing appropriate function keys in keyboard 46, the transcribed text defined in digital data terms is stored in RAM 28 for further editing and/or storage. When the typist releases foot pedal 60, the audio mode is terminated, transmission of audio information ceases and computer 18 initiates a data mode. In the data mode, transcribed information in RAM 28 is transmitted to information storage and retrieval system 12. Whenever the typist depresses foot pedal 60, an interrupt request signal is generated from interrupt processor 68 and computer 18 terminates the data mode and initiates the audio mode which allows the stored audio message in information storage and retrieval system 12 to be transmitted to remote typing station 10.

It will be readily appreciated from the foregoing description that the present invention provides an information processing system in which a single telephone line is used for transferring both digital data and analog voice signals on a shared basis in which digital data is transmitted during a lull in analog voice transmission.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A remote typing station, for connection to an information storage and retrieval system having means for storing and transmitting analog information defining audio messages and receiving digital data defining a transcription for the audio messages, comprising:
    (a) computer means for mutually exclusively initiating and terminating audio and data modes, said data mode being terminated when said audio mode is initiated and said data mode being initiated when said audio mode is terminated;
    (b) interface means connected to said computer means, said interface means configured to receive audio information signals representing an audio message and transmit digital data signals;
    (c) terminal means having a keyboard and display, said terminal means connected to said computer means and said interface means, said terminal means generating digital data signals representing the audio information signals of the audio message received by said interface means whereby the digital data signals constitute transcribed audio information; and (d) switch means connected to said computer means, said switch means having energized and deenergized states, said computer means initiating said audio mode for transmitting a control signal to said information storage and retrieval system when said switch means is in one of said energized and deenergized states, said computer means terminating said audio mode and initiating said data mode for transmitting a further control signal to said information storage and retreival system when said switch means is in the other of said energized and deenergized states.

2. The remote typing station as claimed in claim 1 wherein said computer means includes a central processing unit, a read-only memory and a random access memory, said central processing unit generating command signals for controlling operation of said remote typing station, said read-only memory storing system programs and said random access memory storing transcribed audio information.

3. The remote typing station as claimed in claim 2 further comprising terminal interface means for converting parallel data to serial data and serial data to parallel data, said computer means using parallel data and said terminal means using serial data.

4. The remote typing station as claimed in claim 2 wherein said switch means is a foot pedal.

5. In combination with an information storage and retrieval system having means for storing and transmitting analog information defining audio messages and receiving digital data defining a transcription of the audio messages, a remote typing station communicating with the information storage and retrieval system via a single telephone line, said remote typing station comprising:

(a) computer means for mutually exclusively initiating and terminating audio and data modes, said data mode being terminated when said audio mode is initiated and said data mode being initiated when said audio mode is terminated;

(b) interface means connected to said single telephone line and said computer means, said interface means configured to receive the audio information transmitted by the information storage and retrieval system and to transmit digital data signals defining the transcribed audio information to the information storage and retrieval system with both the audio information signals and digital data signals being transmitted via the single telephone line;

(c) terminal means having a keyboard and display, said terminal means connected to said computer means and said interface means, said terminal means generating the digital data defining the transcribed audio information; and (d) switch means connected to said computer means, said switch means having energized and deenergized states, said computer means initiating said audio mode and transmitting a control signal to said information storage and retrieval system when said switch means is in one of said energized and deenergized states, said computer means terminating said audio mode and initiating said data mode and transmitting a further control signal to said information storage and retrieval system when said switch means is in the other of said energized and deenergized states.

6. The remote typing station as claimed in claim 5 wherein said computer means includes a central processing unit, a read-only memory and a random access memory, said central processing unit generating command signals for controlling operation of said remote typing station and transmission of the audio information and digital data between the remote typing station and information storage and retrieval system, said read-only memory storing system programs and said random access memory storing transcribed audio information.

7. The remote typing station as claimed in claim 6 further comprising terminal interface means for converting parallel data to serial data and serial data to parallel data, said computer means using parallel data and said terminal means using serial data.

8. The remote typing station as claimed in claim 5 wherein said switch means is a foot pedal.

9. The remote typing station as claimed in claim 8 wherein said foot pedal is in said energized state when depressed and in said deenergized state when released.

10. The remote typing station as claimed in claim 8 wherein said foot pedal is a depressable dual switch pedal having forward and reverse energized states when said foot pedal is depressed, said audio mode initiated when said foot pedal is in one of said forward and reverse energized states.

* * * * *